May 31, 1932.  C. W. METZGER  1,860,587
CUTTER FOR ROTARY DRILLS
Filed Feb. 12, 1930   2 Sheets-Sheet 1
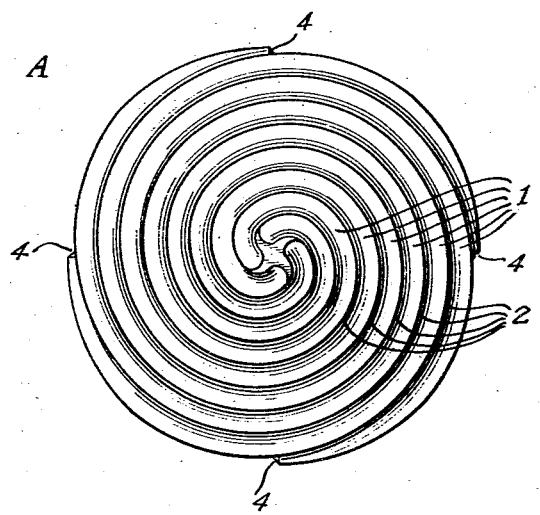
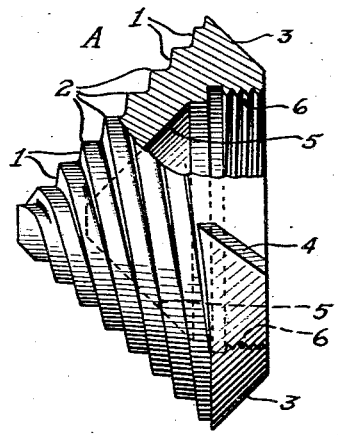
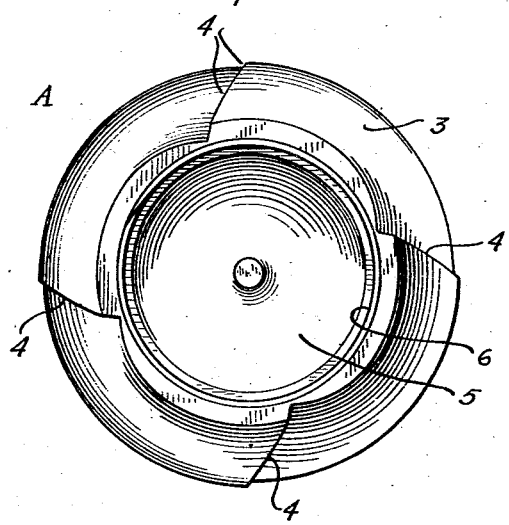
Claude W. Metzger, INVENTOR,
BY
Byrnes, Townsend & Potter, ATTORNEYS.

May 31, 1932.  C. W. METZGER  1,860,587
CUTTER FOR ROTARY DRILLS
Filed Feb. 12, 1930   2 Sheets-Sheet 2

Patented May 31, 1932

1,860,587

UNITED STATES PATENT OFFICE

CLAUDE W. METZGER, OF HOUSTON, TEXAS, ASSIGNOR TO HAYNES STELLITE COMPANY, A CORPORATION OF INDIANA

CUTTER FOR ROTARY DRILLS

Application filed February 12, 1930. Serial No. 427,896.

This invention pertains in general to rotary drills for deep well drilling, and in particular to improved cutters for such drills.

In rotary drills of the type to which my invention has particular reference, two cone-shaped cutters having teeth on their conical surfaces are mounted on the lower end of a drill-head having a threaded portion at the upper end thereof by which it is attached to the lower end of a drill line. The cutters are usually attached to the drill head so the apexes thereof lie close together near the axis of the drill, and the lower or cutting faces of the cutters form a line substantially transverse to the axis of rotation.

During operation drills of this type are rotated in a right-handed direction so the conical cutters roll around on the bottom of the drill hole under the weight of the drill line and the action of their cutting teeth loosens the material with which they come in contact.

It has been the custom, heretofore, to provide such conical cutters with teeth extending either longitudinally thereof along their conical faces, or circumferentially thereof around their conical faces. During operation such cutters exert a crushing action on the material with which they come in contact, and this crushing action soon dulls the cutters so the drill line must be raised and the cutters changed at comparatively frequent intervals, thereby causing much loss of time. Furthermore, the crushing action of the chisel like cutting teeth, and the lack of traverse tooth motion, tends to clog the cutters and impede the removal of detritus by the circulation of water employed for that purpose.

Therefore, the principal object of the present invention is to provide a drill cutter of the type specified having a series of continuous cutting edges which, in addition to the usual crushing action, have a spiral shearing action tending to cut away the formation being drilled and crowd it toward the center of the drill into the direct current of the flushing fluid used for removing the detritus.

A further object of the invention is to provide a drill cutter having cutting teeth of such form and character that their action on the formation being drilled tends to keep their cutting edges sharp instead of making them dull and blunt as heretofore.

A still further object of this invention is to provide a cutter of the type specified that will ream or dress the bore hole during the drilling operation thereby maintaining the size and alignment thereof.

Other aims, objects and novel features, will be apparent from the following specification and the accompanying illustration, in which:

Fig. 1 is a front view of my improved cutter;

Fig. 2 is a side view of the same with the upper portion broken away to show the form of the recess therein;

Fig. 3 is a rear view of the same;

Figure 4:
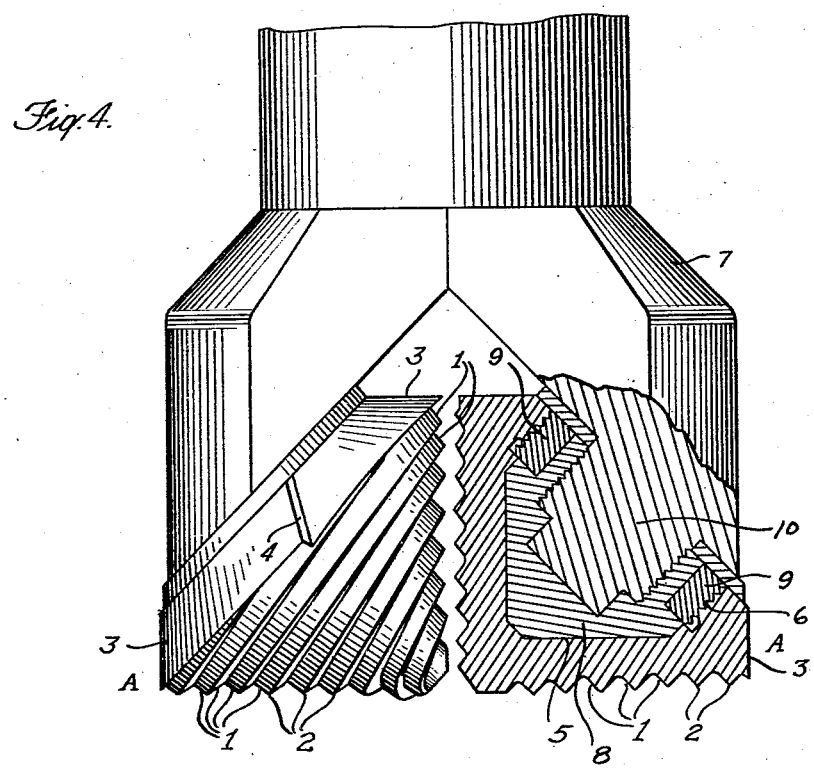
Fig. 4 is a side view, partially in section, of a drill head equipped with my improved cutters; and, Fig. 5 is a diagrammatic view of the bottom of a bore hole showing the path of the cutting edges of the spiral teeth of my improved cutters thereacross.
Figure 5:
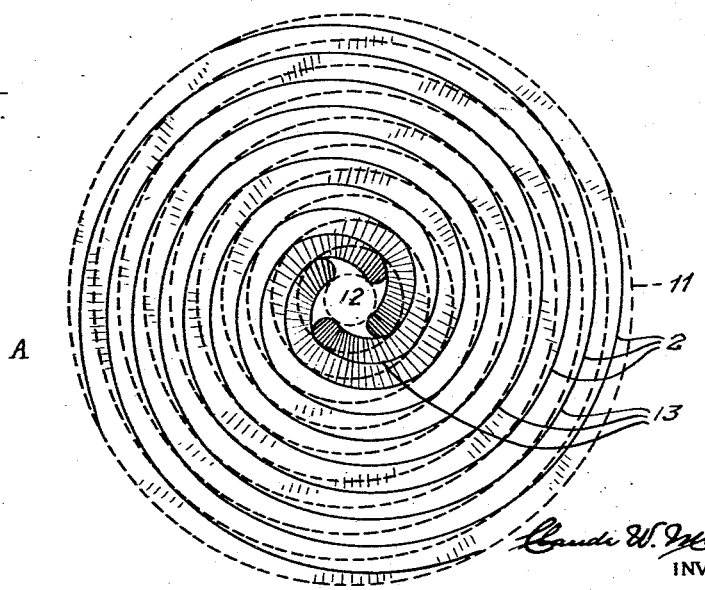

In the preferred embodiment of my invention shown in the accompanying drawings, my improved cutter A is substantially conical in shape and formed on the conical face thereof are a plurality of continuous spirals 1 extending from the apex in a right-handed direction around the conical face to the base. The angle between adjacent sides of the spiral teeth 1 is 90 degrees but this angle may be either greater or less for different kind of service. The crests 2 of the spirals 1, which are the cutting edges, are made sharp to increase their cutting action and, at the same time, comparatively obtuse to increase their strength.

The pitch of the spiral teeth 1 is two inches and the distance between adjacent crests is one half inch. The cutter shown in the illustration has four spiral cutting teeth, but it is within the scope of this invention to employ either more or less teeth and to vary both the pitch thereof and the distance therebetween.

The rear face of my improved cutter A is provided with a beveled surface 3 which is at an angle of 90 degrees to that of the conical face. This angle, as well as that between opposite sides of the conical face, may be varied. The beveled face 3 is provided with a plurality of teeth 4 formed therein for the purpose of reaming or dressing the sides of the bore hole during the drilling operation. In practice I have found that four teeth 4 on the surface 3 is satisfactory, although a different number may be used.

My improved cutter A may be of any suitable material such as tool steel, high speed steel, or a non-ferrous alloy. The cutter may also be of mild steel with the cutting edges of the spiral teeth coated with a wear resisting material such as stellite applied by means of a welding blowpipe. Furthermore, the spiral teeth may be formed by inserting a plurality of individual sections of a wear resisting material such as tungsten carbide or hastellite. These sections may also be welded to the cutters.

The cutter A may be mounted on the drill head 7 by providing a recess or cavity 5 in the rear face of the cutter that fits a conical bearing member 8 threaded to a boss 10 on the head 7 and held to the cutter A by a threaded collar 9. This means of securing the cutter to the drill head is well known in the art and forms no part of the invention, and this or other well known or equivalent attaching means may be employed as conditions warrant.

During the operation of my improved cutter it rolls around on the bottom of the drill hole and the cutting action of the edges 2 of the spiral teeth 1 is continuous and the path of each cutting edges 2 is from the outer edge 11 of the bore hole across the bottom toward the center 12 in the form of a spiral path 13. In addition to the crushing action of cutters of this type, my improved cutter exerts a shearing action on account of the traverse motion of the cutting edges. This traverse motion also crowds the detritus formed in drilling toward the center of the drill hole into the path of the flushing fluid thereby tending to keep the drill hole clear so the cutters can work at maximum efficiency.

Another advantage derived from the traverse motion of the spiral teeth of my improved cutters is their tendency to wear on the sides thereof so they operate with greater efficiency over a longer period of time.

Various changes in the form of the cutters and in the angles forming the various portions thereof may be made, and other equivalent materials may be substituted for those specified without departing from the scope of the invention or sacrificing any of the rights thereunder.

I claim:

1. A cutter for rotary drills having a conical cutting surface provided with quadruple spiral cutting teeth having a pitch of approximately two inches.

2. A cutter for rotary drills having a conical cutting surface provided with a plurality of spiral cutting teeth having an angle of approximately 90 degrees between adjacent sides thereof.

3. A cutter for rotary drills having a conical cutting surface provided with a plurality of spiral cutting teeth having a pitch of approximately two inches and an angle of approximately 90 degrees between adjacent sides thereof, and a beveled surface adjacent said cutting surface having a plurality of cutting teeth thereon for dressing the sides of the bore hole formed by the drill.

4. A cutter for rotary earth boring drills having a conical cutting surface provided with a plurality of spiral cutting teeth thereon for removing material from the bottom of a drill hole; a beveled surface provided with a plurality of spiral cutting teeth thereon for dressing the side of said drill hole; and a wear resisting alloy forming the cutting edge of each of said cutting teeth.

In testimony whereof, I affix my signature.

CLAUDE W. METZGER.